US010051477B2

(12) United States Patent
Nielsen et al.

(10) Patent No.: US 10,051,477 B2
(45) Date of Patent: Aug. 14, 2018

(54) WIRELESS LOCAL AREA NETWORK CO-EXISTENCE WITH CELLULAR NETWORK ON UN-LICENSED BAND

(71) Applicant: Nokia Technologies Oy, Espoo (FI)

(72) Inventors: Sari Kaarina Nielsen, Espoo (FI); Antti Anton Toskala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/316,337

(22) PCT Filed: Jun. 19, 2014

(86) PCT No.: PCT/FI2014/050493
§ 371 (c)(1),
(2) Date: Dec. 5, 2016

(87) PCT Pub. No.: WO2015/193535
PCT Pub. Date: Dec. 23, 2015

(65) Prior Publication Data
US 2017/0164208 A1 Jun. 8, 2017

(51) Int. Cl.
*H04W 16/14* (2009.01)
*H04W 76/30* (2018.01)
(Continued)

(52) U.S. Cl.
CPC .......... *H04W 16/14* (2013.01); *H04W 28/08* (2013.01); *H04W 76/06* (2013.01); *H04W 76/30* (2018.02); *H04W 84/045* (2013.01); *H04W 84/12* (2013.01)

(58) Field of Classification Search
CPC .................................................... H04W 16/14
(Continued)

(56) References Cited

U.S. PATENT DOCUMENTS

2006/0039332 A1* 2/2006 Kotzin ................. H04W 36/14
370/338
2010/0329209 A1* 12/2010 Akselsen ............. H04W 36/14
370/331
(Continued)

FOREIGN PATENT DOCUMENTS

WO 2008005897 1/2008
WO 2012040520 3/2012
(Continued)

OTHER PUBLICATIONS

International Search Report and Written Opinion received for corresponding Patent Cooperation Treaty Application No. PCT/FI2014/050493, dated Jan. 30, 2015, 12 pages.
(Continued)

*Primary Examiner* — Michael T Vu
(74) *Attorney, Agent, or Firm* — Nokia Technologies Oy

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: detect an indication for a local area network activation; and determine whether or not to terminate a wide area network connection on an unlicensed band in an instance in which the wide area network connection on the unlicensed band is active and the local area network operates on the same unlicensed band.

17 Claims, 8 Drawing Sheets

(51) Int. Cl.
*H04W 28/08* (2009.01)
*H04W 76/06* (2009.01)
*H04W 84/04* (2009.01)
*H04W 84/12* (2009.01)

(58) Field of Classification Search
USPC .............................................. 455/452.1–454
See application file for complete search history.

(56) References Cited

U.S. PATENT DOCUMENTS

| 2012/0207134 | A1* | 8/2012 | Karaoguz | H04M 1/725 |
| | | | | 370/331 |
| 2013/0242830 | A1 | 9/2013 | Lee et al. | |
| 2013/0242897 | A1* | 9/2013 | Meylan | H04W 28/16 |
| | | | | 370/329 |
| 2013/0343288 | A1 | 12/2013 | Ratasuk et al. | |
| 2014/0044105 | A1 | 2/2014 | Bontu et al. | |

FOREIGN PATENT DOCUMENTS

| WO | 2013088387 | 6/2013 |
| WO | 2013131257 | 9/2013 |
| WO | 2013138720 | 9/2013 |
| WO | 2013/179095 A1 | 12/2013 |

OTHER PUBLICATIONS

3GPP TR 36.816 V11.2.0 (Dec. 2011). 3rd Generation Partnership Project; Technical Specification Group Radio Access Network; Evolved Universal Terrestrial Radio Access (E-UTRA); Study on signalling and procedure for interference avoidance for in-device coexistence (Release 11).

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.1.0, Mar. 2014, pp. 1-356.

"Galaxy S5 Download Booster Exclusive to T-Mobile, U.S. Cellular", Laptop, Retrieved on Jan. 15, 2017, Webpage available at : https://www.laptopmag.com/articles/galaxy-s5-download-booster.

"Qualcomm's Unlicensed LTE Could Crush Carrier Wi-Fi's Momentum", FierceWireless, Retrieved on Jan. 15, 2017, Webpage available at : https://www.fiercewireless.com/tech/qualcomm-s-unlicensed-lte-could-crush-carrier-wi-fi-s-momentum.

Elsherif et al., "Adaptive Small Cell Access of Licensed and Unlicensed Bands", IEEE International Conference on Communications, 2013, pp. 6327-6332.

Liu et al., "Traffic Assignment Over Licensed and Unlicensed Bands for Dual-band Femtocells", InterDigital, Jan. 2011, 6 pages.

Extended European Search Report received for corresponding European Patent Application No. 14895286.4, dated Jan. 15, 2018, 6 pages.

"In-Device Interference Avoidance Solutions Overview", 3GPP TSG-RAN Working Group 2 meeting #73bis, R2-111859, Agenda: 6.8.3, Nokia Corporation, Apr. 11-15, 2011, 7 pages.

"Hitachi Perspectives on LTE-U", 3GPP Workshop on LTE in Unlicensed Spectrum, RWS-140017, Hitachi Ltd., Jun. 13, 2014, 12 pages.

\* cited by examiner

WIRELESS LOCAL AREA NETWORK CO-EXISTENCE WITH CELLULAR NETWORK ON UN-LICENSED BAND

RELATED APPLICATION

This application was originally filed as PCT Application No. PCT/FI2014/050493 filed Jun. 19, 2014.

TECHNICAL FIELD

The present application relates to wireless communications and, in particular, wireless local area network (WLAN) co-existence with wireless wide area network, such as Long Term Evolution (LTE) system, which operates on unlicensed band.

BACKGROUND

The ever-increasing mobile traffic load leads to a pressing need for additional spectral resources of cellular systems, which are deployed in the spectrum mainly from 700 MHz to 2.6 GHz. More operators are now facing the challenge of soaring traffic with ever increasing number of people using mobile broadband services, as well as the traffic demand per person. While mobile broadband system in licensed spectrum is highly efficient due to its exclusive occupancy of the spectrum, the amount of available licensed spectrum can be limited and costly.

On the other hand, the amount of unlicensed spectrum assigned or currently planned to be assigned is comparable to or even more than the amount of licensed spectrum. To further expand mobile broadband system in licensed spectrum to meet the traffic demands, such as Long Term Evolution (LTE) system, a natural way is to integrate unlicensed carrier into the overall LTE system by adapting LTE protocols to operate in the unlicensed spectrum, named as LTE Unlicensed (LTE-U) or as License Assisted Access (LAA) using LTE. Extending the benefits of LTE to unlicensed spectrum brings its basic tenets of high-efficiency and robust mobility, while also making it a seamless extension of the larger LTE network. That means higher performance for operators and better broadband experience for users, and a common unified network for all spectrum types.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: detect an indication for a local area network activation; and determine whether or not to terminate a wide area network connection on an unlicensed band in an instance in which the wide area network connection on the unlicensed band is active and the local area network operates on the same unlicensed band According to a second aspect of the present invention, a method comprising: detecting an indication for a local area network activation; and determining whether or not to terminate a wide area network connection on an unlicensed band in an instance in which the wide area network connection on the unlicensed band is active and the local area network operates on the same unlicensed band.

According to a third aspect of the present invention, a computer program product comprising a non-transitory computer-readable medium bearing computer program code embodied therein for use with a computer, the computer program code comprising: code for detecting an indication for a local area network activation; and code for determining whether or not to terminate a wide area network connection on an unlicensed band in an instance in which the wide area network connection on the unlicensed band is active and the local area network operates on the same unlicensed band.

According to a fourth aspect of the present invention, an apparatus comprising: at least one processor; and at least one memory including computer program code, wherein the at least one memory and the computer program code are configured to, with the at least one processor, cause the apparatus to perform at least the following: receive information associated with activation of a local area network or information associated with termination of a wide area network connection on an unlicensed band; and terminate the connection of the wide area network on the unlicensed band.

According to a fifth aspect of the present invention, an apparatus comprising: means for detecting an indication for a local area network activation; and means for determining whether or not to terminate a wide area network connection on an unlicensed band in an instance in which the wide area network connection on the unlicensed band is active and the local area network operates on the same unlicensed band According to a sixth aspect of the present invention, an apparatus comprising: means for receiving information associated with activation of a local area network or information associated with termination of a wide area network connection on an unlicensed band; and means for terminating the connection of the wide area network on the unlicensed band.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
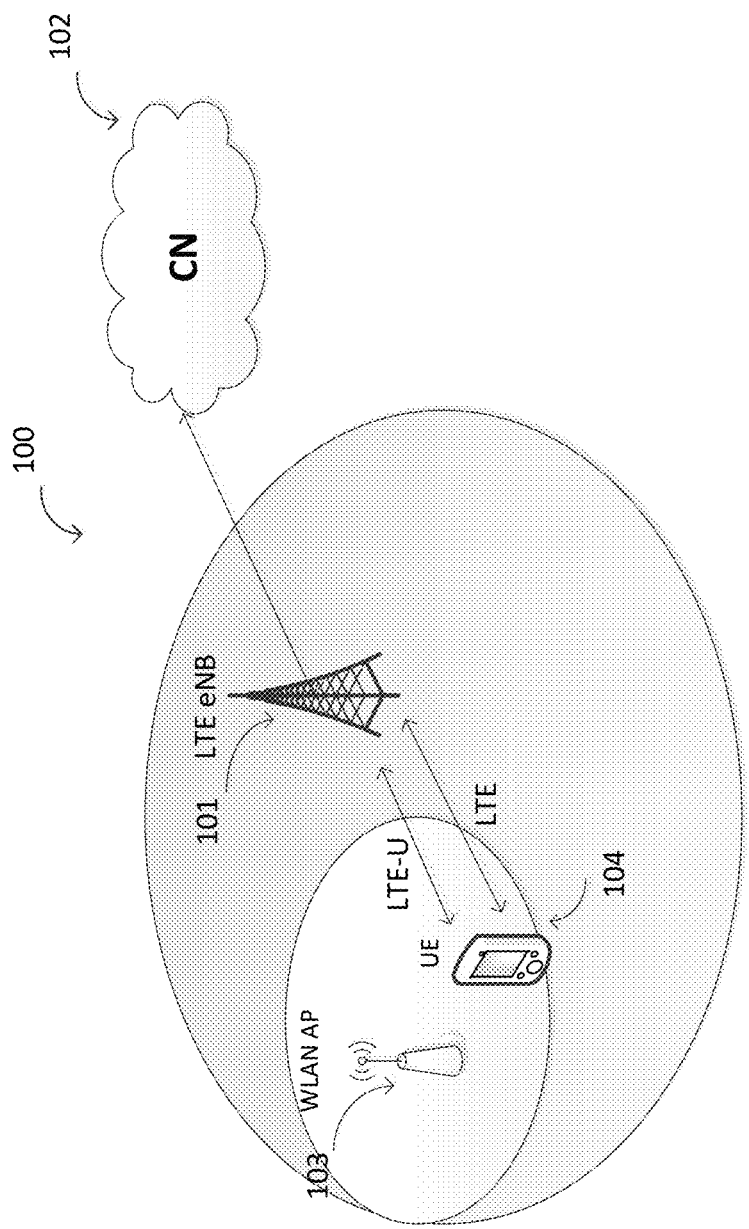
FIG. 1 depicts an example of a heterogeneous network in which some embodiments of the present invention may be practiced.

FIG. 1 illustrates an example heterogeneous network 100 in which some example embodiments of the present invention may be practiced. As illustrated in FIG. 1, a UE 104 is under control of a macro base station, for example, an eNB 101 in a LTE network, on licensed band or on unlicensed band or on both licensed band and unlicensed band. UE 104 is connected to core network (CN) 102 through the eNB 101. UE 104 may be in connection with a small cell base station, such as a WLAN access point (AP) 103. The coverage areas of the base stations are depicted by ellipses of different sizes, wherein the coverage area of the macro base station is much larger than that of the small cell base station and overlays the coverage area of the small cell base station.

Although FIG. 1 depicts a certain quantity and configuration of devices, other quantities and configurations may be implemented as well. For example, other quantities and configurations of base stations/access points, cells, and user equipment may be implemented as well.

Figure 2:
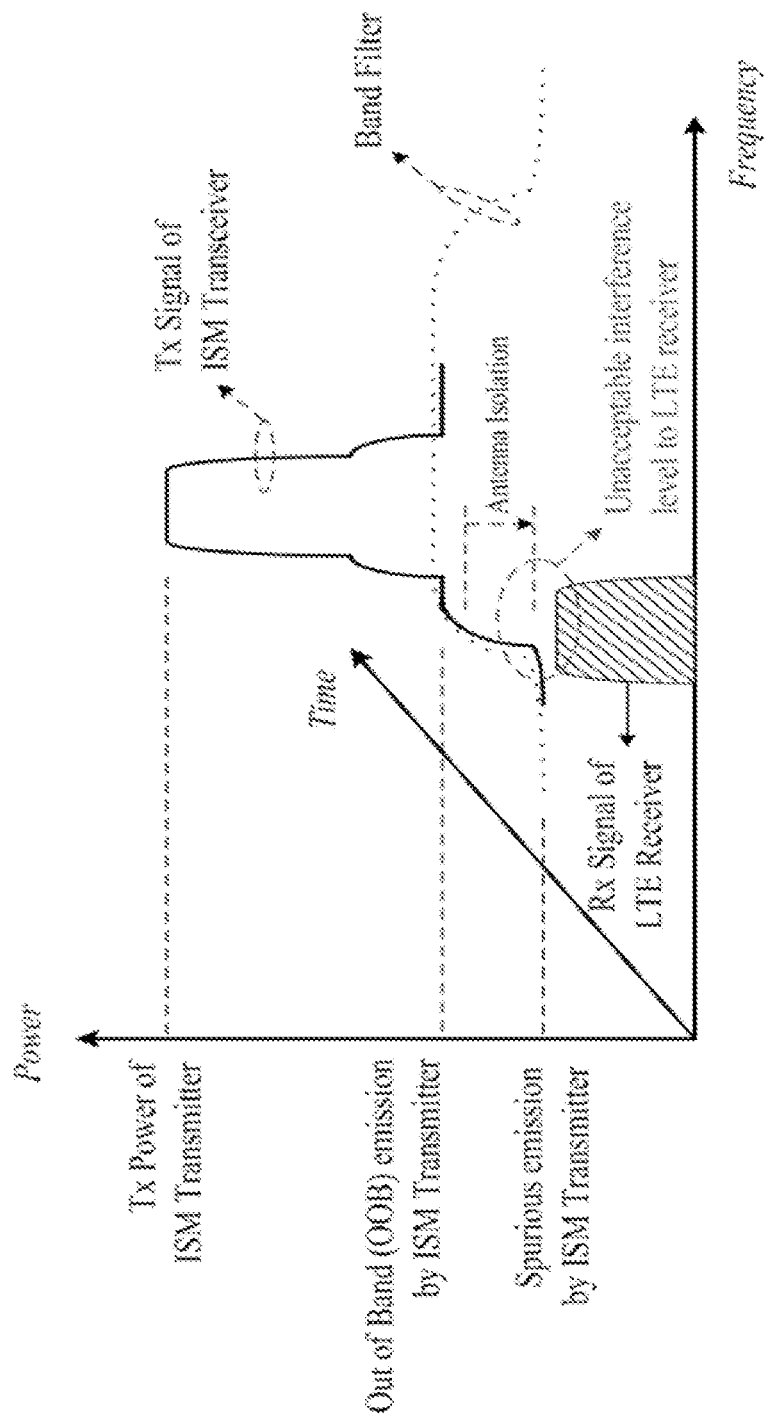
FIG. 2 depicts an example of radio frequency co-existence between LTE-U and WLAN in the same device when the frequencies of LTE-U and ISM band for WLAN are close or overlapping.

Simultaneous operations of LTE-U and WLAN in the same device may not be desirable in the same band due to in-device co-existence issues, at least not when frequencies are close or overlapping. FIG. 2 depicts an example of radio frequency (RF) co-existence between LTE-U and WLAN in the same device when the frequencies of LTE-U and ISM (Industrial, Scientific and Medical) band for WLAN are close or overlapping. The ISM transceiver requirements are often rather loose, and transmission powers are not dependent on LTE side transmission or reception levels in the same device. As can be seen from FIG. 2, the transmission signal of ISM transceiver may cause unacceptable level of interference to LTE receiver. When a user decides to start WLAN, for example, at home using home WLAN access point or in a shopping mall or in other public place a public WLAN access point, but the device is already having LTE-U connection active at the same band as WLAN, the WLAN reception and transmission is likely to be degraded due to ongoing LTE-U data connection. In addition, from the network point this device's internal interference from WLAN to LTE-UE can cause unpredictable UE behavior and performance degradation. Furthermore, if in the device the same RF is used both for WLAN and LTE-U on the same band, the reception and transmission of both technologies is not possible at all.

The subject matter disclosed herein provides a way for the co-existence of WLAN with LTE-U in the same band and in the same device. Specifically, there is provided a way of detecting a WLAN is to be activated and determining whether or not to terminate ongoing LTE-U data connection on the same unlicensed band—allowing the network to terminate the ongoing LTE-U data connection, if it so chooses, and continuing with WLAN activation. The services being carried using at least partly LTE-U would be moved to licensed band LTE operation, to other radio access technology such as GSM/EDGE or WCDMA/HSPA, or alternatively to be carried over WLAN.

Figure 3:
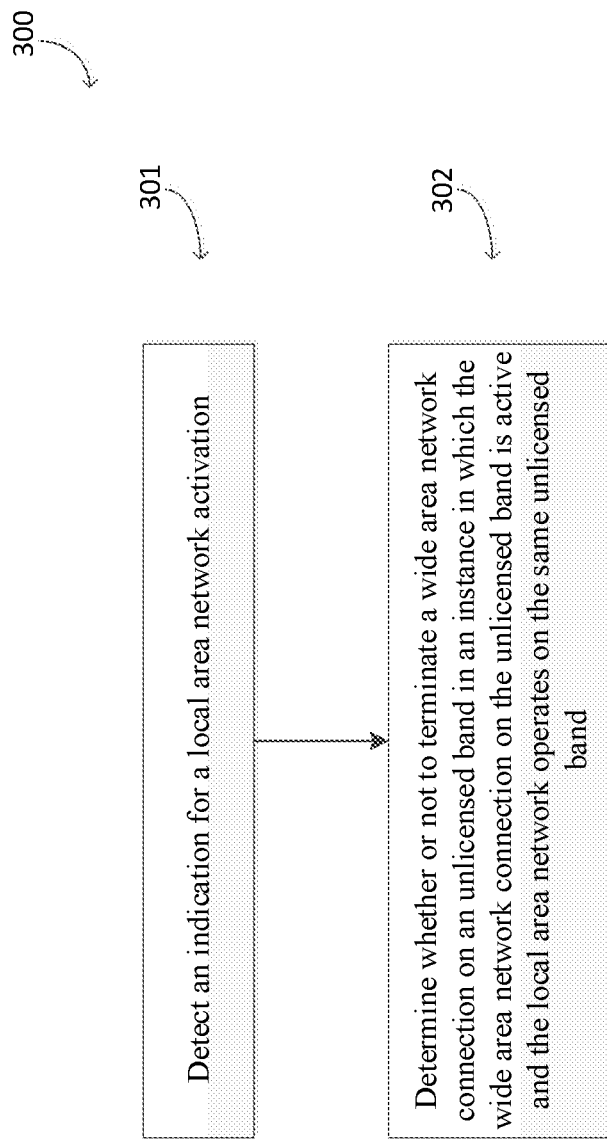
FIG. 3 depicts an example process for WLAN and LTE-U co-existence in the same band and same device in accordance with some embodiments of the invention.

FIG. 3 depicts an example process for WLAN and LTE-U co-existence in the same band and same device in accordance with some embodiments of the invention. Example process 300 may be performed by or in a user equipment (UE), such as the UE 104 of FIG. 1 and the apparatus 10 of FIG. 7.

At 301, UE detected an indication for activation of a local area network, for example WLAN 103. The WLAN may operate in unlicensed band, for example, the 2.4 GHz or 5 GHz band.

At 302, if a wide area network on the same unlicensed band, for example LTE-U, is active, for example, is configured and/or has ongoing data connection, the UE determines whether or not to terminate the LTE-U configuration and/or ongoing data connection.

In some example embodiments, UE sends information to a network element, for example, a macro cell base station eNB 101, that WLAN which will operate on the same band as ongoing LTE-U data connection is to be activated. In some other example embodiments, UE sends information to eNB 101 that ongoing LTE-U is to be terminated, which is due to the activation of WLAN which will operates on the same band as the ongoing LTE-U. When eNB 101 receives the request from UE, it may terminate the ongoing LTE-U data connection, for example, removing the LTE-U configuration from the UE. It may move at least some of the traffic from LTE-U to a licensed band of LTE or another radio access technology system.

UE may start scanning WLAN network and connected to a WLAN access point (AP) 103. When the WLAN connection is no longer needed, for example, the WLAN session is over or no WLAN is found or user disabled WLAN, UE may inform eNB 101 of the completion of WLAN connection. UE may report to eNB 101 if LTE-U could be resumed. In some example embodiments, the signaling is carried on UE capability update, where it indicates when LTE-U on a certain band is supported and when is not supported. When eNB 101 receives the information, it may reconfigure and/or reactivate LTE-U.

UE may receive notification from a user interface (UI) that LTE-U connection is active.

Figure 4:
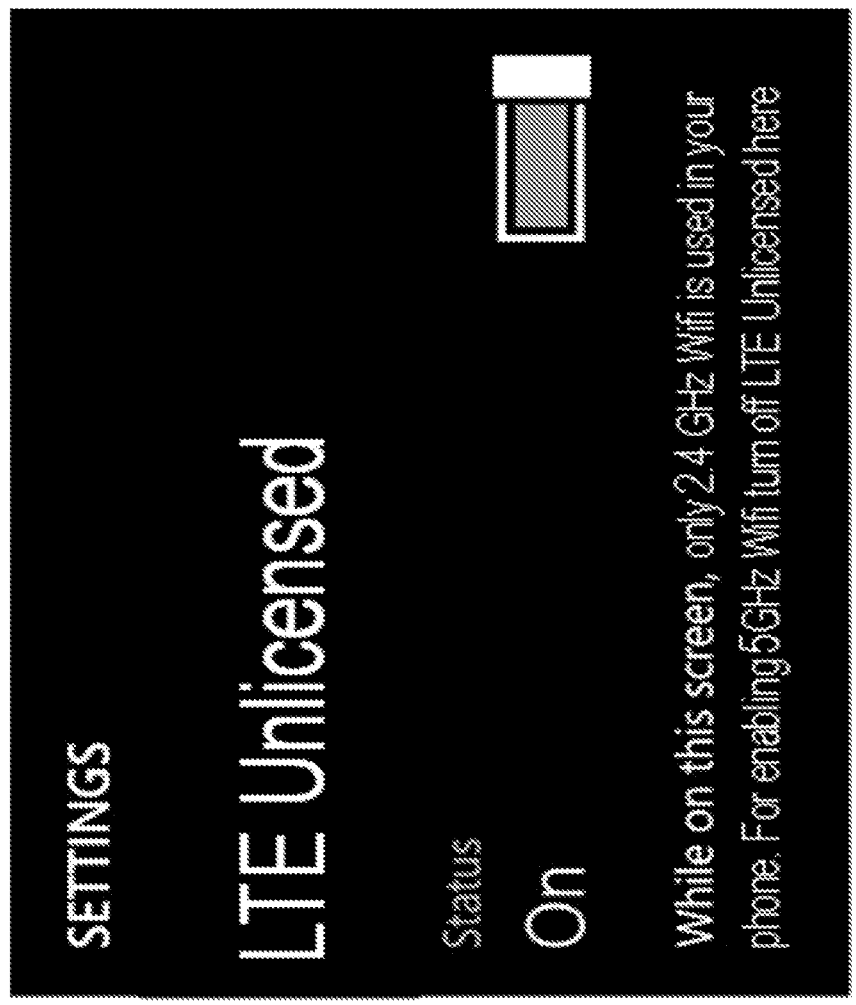
FIG. 4 depicts an example of UI settings for LTE-U and WLAN in accordance with some embodiments of the invention.

In some example embodiments, UE receives information from the UI on whether to terminate the LTE-U connection or use a portion of the unlicensed band only for WLAN. UE then determines whether to terminate the LTE-U connection or use a portion of the unlicensed band only for WLAN. If UE determined to activate WLAN on the same band and terminate LTE-U, UE may report the determination to eNB 101. Further user selection may be enabled by UI. FIG. 4 depicts an example of UI settings for LTE-U and WLAN in accordance with some embodiments of the invention. As can be seen from FIG. 4, in the device setting, there is an option for a user to select whether to activate LTE-U, for example, at 5 GHz band which is overlapping with the WLAN's 5 GHz band. If the user activates, for example, turns on LTE-U in the device, the device's setting informs the user that the device is only able to use WLAN on 2.4 GHz band or any other non-overlapping band (or not even able to use WLAN if all supported WLAN bands overlap with LTE-U bands). The settings may inform the user that in order to activate, for example, 5 GHz WLAN, the user has to turn off LTE-U. If LTE-U is activated and/or configured, when the user turns off LTE-U in the device settings, the user may be warned by the device UI about the ongoing LTE-U connection and ask whether the user is sure about turning off LTE-U. If the user turns off LTE-U, UE may send information to eNB 101 on termination of LTE-U. UE may also send information to eNB 101 that it is no longer LTE-U capable. eNB 101 may terminate LTE-U from the UE. It may also update UE capability so that this given UE is no longer LTE-U capable until new LTE-U capability is received from this UE.

Figure 5:
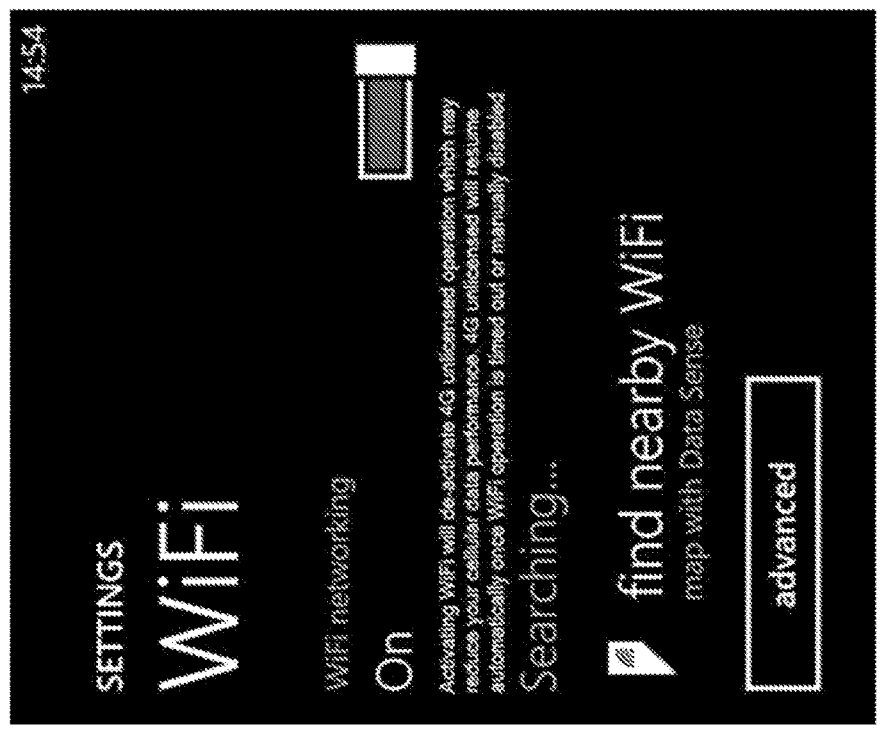
FIG. 5 depicts another example of UI settings for LTE-U and WLAN in accordance with some embodiments of the invention.

In some other example embodiments, the UE is notified that LTE-U will be terminated if WLAN is activated. FIG. 5 depicts another example of UI settings for LTE-U and WLAN in accordance with some embodiments of the invention. As can be seen from FIG. 5, user is notified that activating WLAN will terminate LTE-U. User may be also notified that LTE-U will resume automatically once WLAN operation is timed out or manually disabled. UE may inform eNB 101 that LTE-U will not be supported by the UE at this point in time. This indication may be specific to some bands or band combination, with the band combination referring to the licensed band used together with the LTE-unlicensed operation in the unlicenced band.

Figure 6:
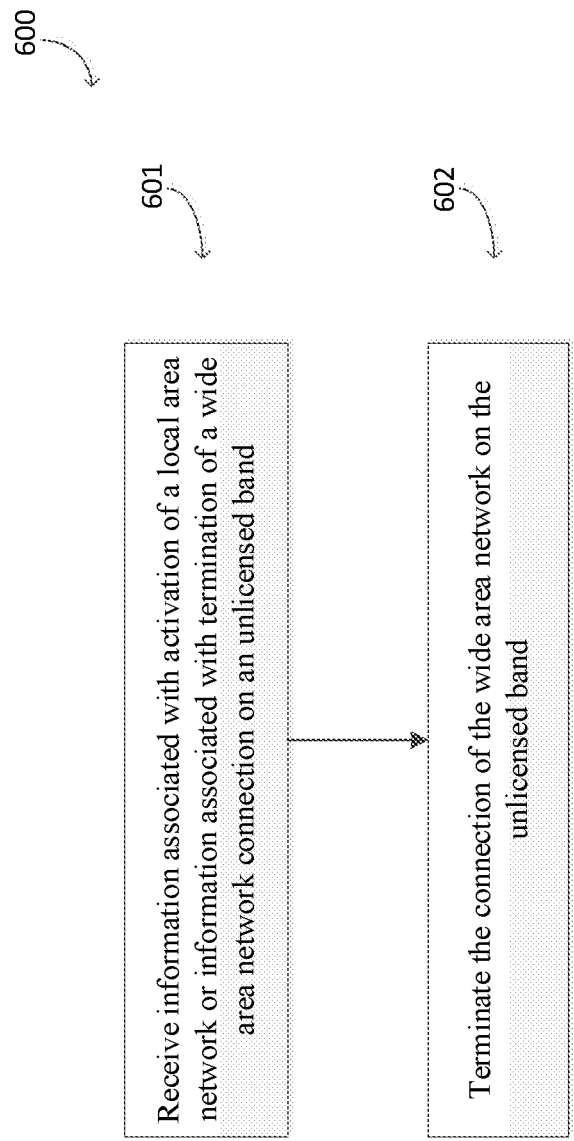
FIG. 6 depicts another example process for WLAN and LTE-U co-existence in the same band and same device in accordance with some embodiments of the invention.

FIG. 6 depicts another example process for WLAN and LTE-U co-existence in the same band and same device in accordance with some embodiments of the invention. Example process 600 may be performed by or in a network element, such as the eNB 101 of FIG. 1 and the base station of FIG. 8.

At 601, eNB 101 receives information associated with activation of a local area network, for example, WLAN 103, or information associated with termination of a wide area network connection on an unlicensed band, for example, LTE-U.

At 602, eNB 101 terminates the LTE-U.

eNB 101 may move traffic from LTE-U to a licensed band LTE or another radio access technology system. eNB 101 may receive information from a UE on completion of WLAN connection. This indication may be update to the UE capability (indicating that LTE-U is again available for some bands or band combinations). eNB 101 may inform UE to resume connection of LTE-U when receiving completion of the WLAN connection.

Figure 7:
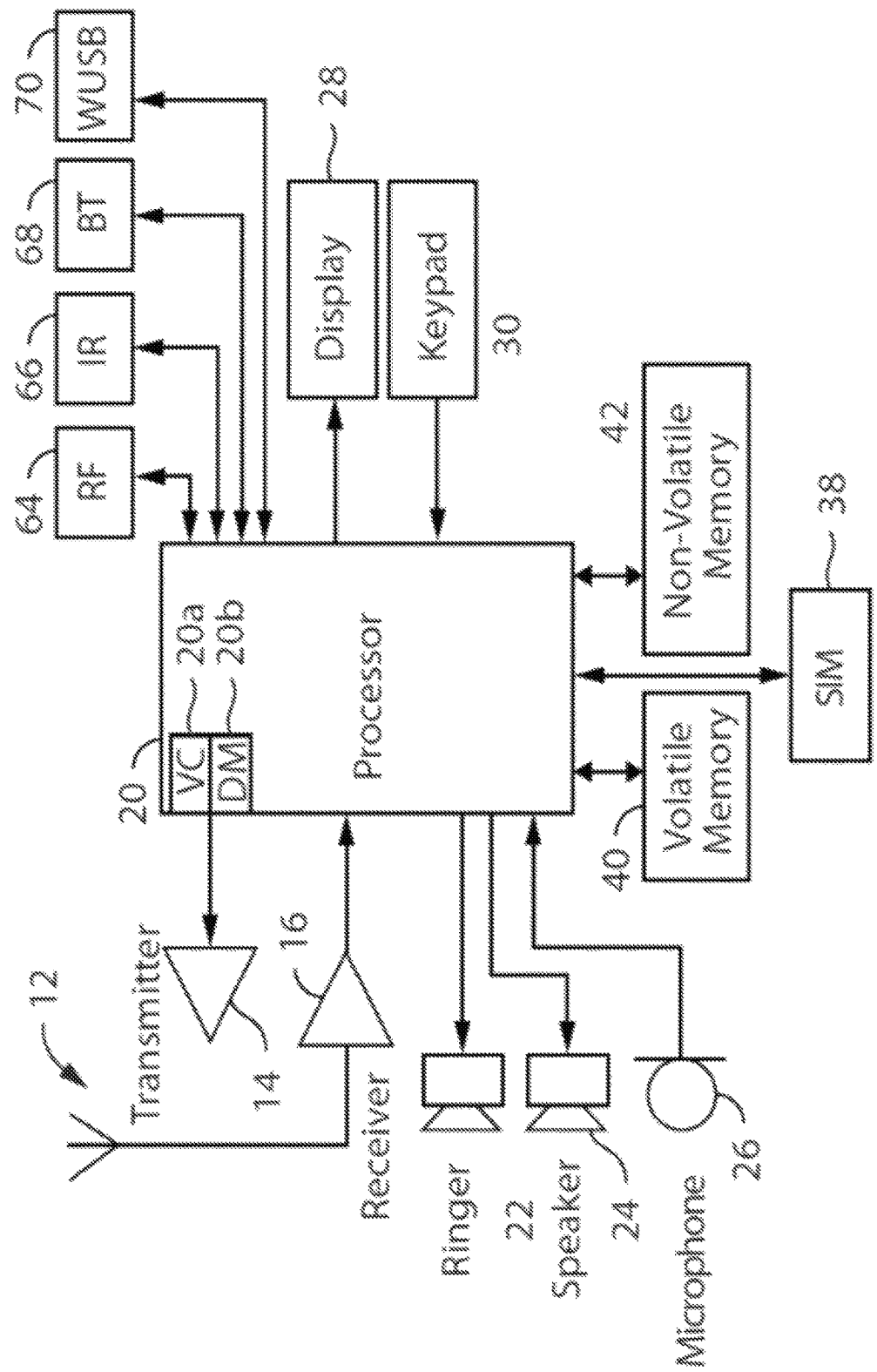
FIG. 7 illustrates a block diagram of a user equipment in accordance with some embodiments of the invention.

FIG. 7 illustrates a block diagram of an apparatus 10, in accordance with some example embodiments. The apparatus 10 (or portions thereof) may be configured to provide a user equipment, a communicator, a machine type communication device, a wireless device, a wearable device, a smartphone, a cellular phone, a wireless sensor/device (for example, a wireless device which is part of a distributed architecture in for example, a car, a vehicle, a robot, a human, and/or the like). In the case of the distributed architecture, the wireless device may communicate via one or more transceiver modules and/or via a hub that may hide the actual distribution of functionalities from the network.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit, ASIC, or field programmable gate array (FPGA), and/or the like) or some combination thereof. Accordingly, although illustrated in FIG. 7 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be subsequently developed.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20*a*, an internal data modem, DM, 20*b*, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 7, apparatus 10 may also include one or more mechanisms for sharing and/or obtaining data. For example, the apparatus may comprise a short-range radio frequency, RF, transceiver and/or interrogator 64, so data may be shared with and/or obtained from electronic devices in accordance with RF techniques. The apparatus may comprise other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise a memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 300 including for example detecting an indication of WLAN activation and determining whether or not to terminate ongoing LTE-U connection or configuration.

Figure 8:
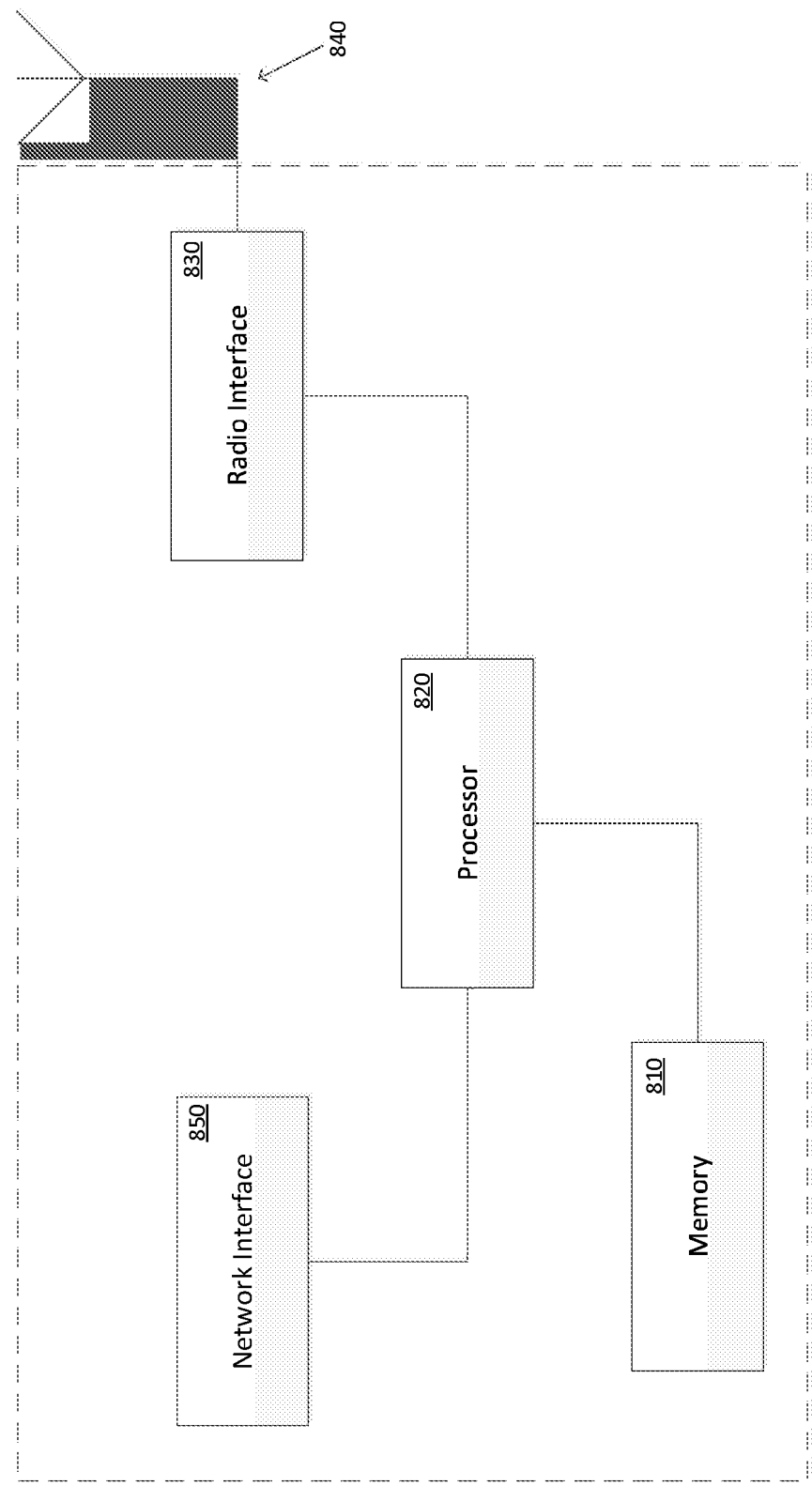
FIG. 8 illustrates a block diagram of a base station in accordance with some embodiments of the invention.

FIG. 8 depicts an example implementation of a base station in accordance with some embodiments of the invention, such as eNB 101 of FIG. 1. The base station may include one or more antennas 840 configured to transmit via a downlink and configured to receive uplinks via the antenna(s). The base station may further include a plurality of radio interfaces 830 coupled to the antenna 840. The radio interfaces 830 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 830 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).). The base station may further include one or more network interfaces 850, for receiving and transmitting to other base stations and/or core networks. The base station may further include one or more processors, such as processor 820, for controlling the interfaces 830 and 850 and for accessing and executing program code stored in memory 810. In some example embodiments, the memory 810 includes code, which when executed by at least one processor causes one or more of the operations described herein with respect to a base station.

Without in any way limiting the scope, interpretation, or application of the claims appearing below, a technical effect of one or more of the example embodiments disclosed herein may include enabling co-existence of local area network such as WLAN and a wide area network such as LTE when LTE operates on the same or overlapping unlicensed band as WLAN.

Embodiments of the present invention may be implemented in software, hardware, application logic or a combination of software, hardware and application logic. The software, application logic and/or hardware may reside on a non-transitory memory 40 and/or 42, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 7 and FIG. 8. A computer-readable medium may comprise a computer-readable non-transitory storage medium that may be any media or means that can contain or store the instructions for use by or in connection with an instruction execution system, apparatus, or device, such as a computer. The scope of the present invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on". The use of the phase "such as" means "such as for example" unless otherwise indicated.

What is claimed is:

1. A method comprising:
   having, by a user equipment, ongoing connection with a network element of a wide area network in which the wide area network operating on an unlicensed band,
   detecting, by the user equipment, an indication for a local area network activation, wherein the local area network operates on a frequency band the same or overlapping with the unlicensed band,
   determining, by the user equipment, whether or not to terminate the wide area network connection on the unlicensed band,
   in response to a positive result of the determination:
      terminating the connection of the wide area network on the unlicensed band, and
      in response to termination the connection of the wide area network on the unlicensed band, scanning the local area network and connecting to an access point of the local area network.

2. The method of claim 1, wherein the local area network is a wireless local area network (WLAN).

3. The method of claim 1, wherein the wide area network is a long term evolution network (LTE).

4. The method of claim 1, further comprising: in response to a positive result of the determination,
   sending information associated with the activation of the local area network or information associated with the termination of the wide area network connection on the unlicensed band to the network element of the wide area network.

5. The method of claim 4, further comprising moving traffic from the wide area network on the unlicensed band to at least one of: the wide area network on a licensed band, another wide band network, and the local area network.

6. The method of claim 1, further comprising receiving a notification from a user interface, wherein the notification notifies that the wide area network connection on the unlicensed band is active.

7. The method of claim 1, further comprising: in response to a positive result of the determination, receiving notification from a user interface that the wide area network connection on the unlicensed band is ongoing and whether to proceed with the termination.

8. An apparatus, comprising:
   at least one processor; and
   at least one memory including computer program code, wherein the at least one memory and the computer program code are configured to, with the at least one processor, cause the apparatus at least to:
   have ongoing connection with a network element of a wide area network in which the wide area network operating on an unlicensed band,
   detect an indication for a local area network activation, wherein the local area network operates on a frequency band the same or overlapping with the unlicensed band,
   determine whether or not to terminate the wide area network connection on the unlicensed band,
   in response to a positive result of the determination:
      terminating the connection of the wide area network on the unlicensed band, and
      in response to termination the connection of the wide area network on the unlicensed band, scanning the local area network and connecting to an access point of the local area network.

9. The apparatus of claim 8, wherein the local area network is a wireless local area network (WLAN).

10. The apparatus of claim 8, wherein the wide area network is a long term evolution network (LTE).

11. The apparatus of claim 8, the apparatus is further caused to, in response to a positive result of the determination,
   send information associated with the activation of the local area network or information associated with the termination of the wide area network connection on the unlicensed band to the network element of the wide area network.

12. The apparatus of claim 11, the apparatus is further caused to move traffic from the wide area network on the unlicensed band to at least one of: the wide area network on a licensed band, another wide band network, and the local area network.

13. The apparatus of claim 11, the apparatus is further caused to send information on completion of the local area network connection to the network element of the wide area network.

14. The apparatus of claim 8, the apparatus is further caused to receive a notification from a user interface, wherein the notification notifies that the wide area network connection on the unlicensed band is active.

15. The apparatus of claim 14, the apparatus is further caused to receive information from the user interface on whether to terminate the wide area network connection on the unlicensed band or use a portion of the unlicensed band only for the local area network connection.

16. The apparatus of claim 14, the apparatus is further caused to receive a notification from the user interface the wide area network connection on the unlicensed band is to be terminated if the local area network is activated.

17. The apparatus of claim 8, the apparatus is further caused to, in response to a positive result of the determination, receive notification from a user interface that the wide area network connection on the unlicensed band is ongoing and whether to proceed with the termination.

* * * * *